US012652494B2

(12) United States Patent
Takemoto et al.

(10) Patent No.: US 12,652,494 B2
(45) Date of Patent: Jun. 9, 2026

(54) VOICE TRANSMISSION SYSTEM

(71) Applicant: Panasonic Automotive Systems Co., Ltd., Kanagawa (JP)

(72) Inventors: Makoto Takemoto, Kanagawa (JP); Susumu Yoneta, Kanagawa (JP); Eiichi Kaminishi, Osaka (JP); Yuki Shiraya, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 145 days.

(21) Appl. No.: 18/808,633

(22) Filed: Aug. 19, 2024

(65) Prior Publication Data

US 2025/0071481 A1 Feb. 27, 2025

(30) Foreign Application Priority Data

Aug. 23, 2023 (JP) ................................ 2023-135641

(51) Int. Cl.
*H04R 5/04* (2006.01)
*H04R 3/00* (2006.01)

(52) U.S. Cl.
CPC ............... *H04R 5/04* (2013.01); *H04R 3/005* (2013.01)

(58) Field of Classification Search
CPC ................................. H04R 5/04; H04R 3/005
See application file for complete search history.

(56) References Cited

U.S. PATENT DOCUMENTS

2023/0131342 A1* 4/2023 Takemoto ................ H04R 1/04 381/58

FOREIGN PATENT DOCUMENTS

JP 2020150487 A 9/2020

* cited by examiner

*Primary Examiner* — Andrew Sniezek
(74) *Attorney, Agent, or Firm* — Seed Intellectual Property Law Group LLP

(57) ABSTRACT

A voice transmission system includes an input circuit receiving a signal from a differential output microphone, and including: an operational amplifier having an input side connected to a first output terminal and a second output terminal of the differential output microphone, and an output side connected to an analog/digital converter outputting, to a slave circuit connected to a master circuit, a voice signal obtained by analog/digital conversion of a signal output from the input circuit; a power supply connected to the input side and performing phantom power supply; and an output section connected between the input side and a slave circuit, outputting a first output voltage to the slave circuit when the differential output microphone is connected to the input circuit, and outputting a second output voltage different from the first output voltage to the slave circuit when the differential output microphone is not connected to the input circuit.

10 Claims, 11 Drawing Sheets

VOICE TRANSMISSION SYSTEM

CROSS-REFERENCE TO RELATED APPLICATIONS

This application is based upon and claims the benefit of priority from Japanese Patent Application No. 2023-135641, filed on Aug. 23, 2023, the entire contents of which are incorporated herein by reference.

FIELD

The present disclosure relates to a voice transmission system.

BACKGROUND

Conventionally, a two-wire communication system represented by an Automotive Audio Bus (A2B) (registered trademark) is known. This two-wire communication system can be applied to, for example, a vehicle.

For example, as a method for detecting disconnection of a microphone module in a two-wire communication system, a method is known in which a dedicated line is provided for each microphone module, and the disconnection of the microphone module is detected according to a state of the dedicated line.

A related technique is disclosed in JP 2020-150487 A.

However, in the related art, since it is necessary to provide a dedicated line for detecting a disconnection, there is a problem that wiring becomes complicated.

SUMMARY

A voice transmission system includes a master circuit, a slave circuit, at least one microphone module, an input circuit, and an analog/digital converter. The slave circuit is connected to the master circuit via one or more transmission lines. The at least one microphone module includes a differential output microphone having a first output terminal and a second output terminal. A signal from the differential output microphone is input into the input circuit. The analog/digital converter outputs, to the slave circuit, a voice signal obtained by analog/digital conversion of a signal output from the input circuit. The input circuit includes an operational amplifier, a power supply, and an output section. The operational amplifier has an input side and an output side. The first output terminal and the second output terminal of the differential output microphone is connected to the input side. The analog/digital converter is connected to the output side. The power supply is connected to the input side of the operational amplifier and performs phantom power supply. The output section is connected between the input side of the operational amplifier and the slave circuit, outputs a first output voltage to the slave circuit when the differential output microphone is connected to the input circuit, and outputs a second output voltage different from the first output voltage to the slave circuit when the differential output microphone is not connected to the input circuit.

DETAILED DESCRIPTION

Hereinafter, a voice transmission system according to an embodiment of the present disclosure will be described in detail with reference to the accompanying drawings.

(1) First Embodiment

Figure 1:
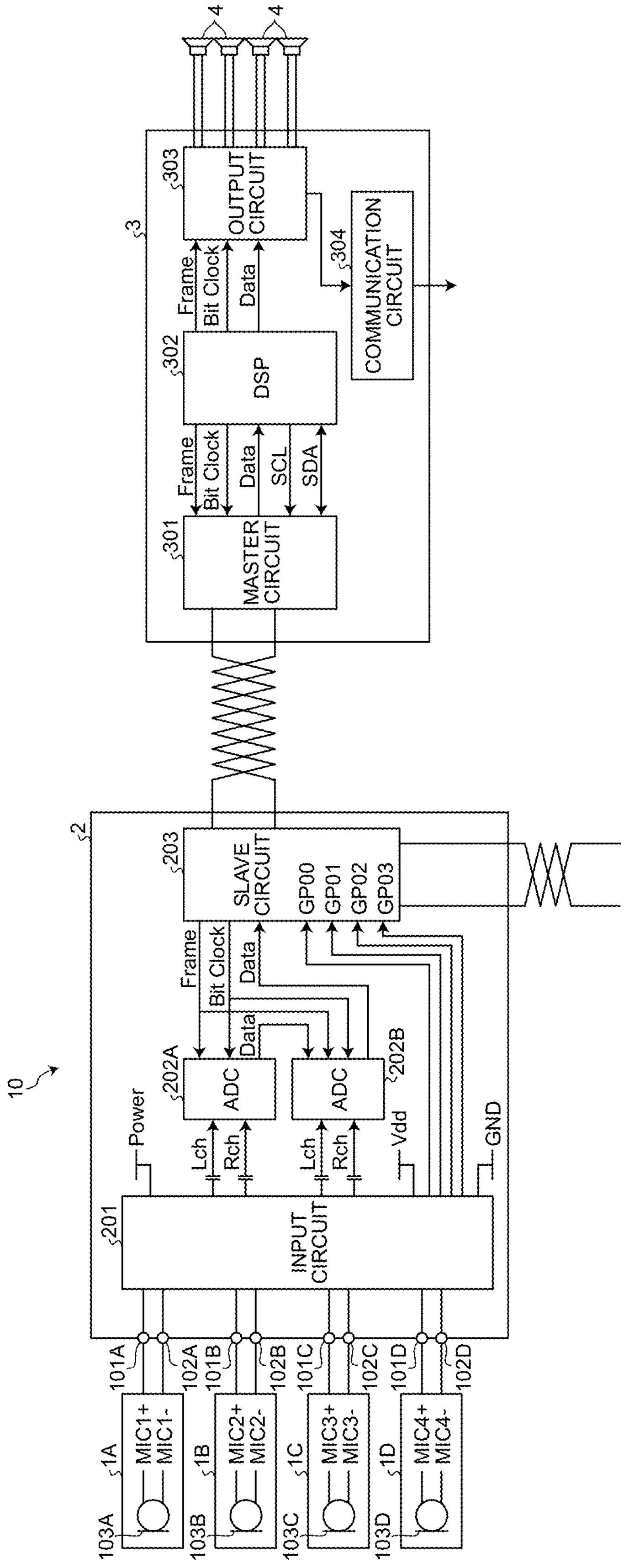
FIG. 1 is a diagram illustrating an example of a configuration of a voice transmission system according to a first embodiment.

FIG. 1 is a diagram illustrating an example of a configuration of a voice transmission system 10 according to a first embodiment.

As illustrated in FIG. 1, the voice transmission system 10 includes a plurality of (four in the example of FIG. 1) microphone modules 1A to 1D, a slave board 2, and a master board 3.

Hereinafter, when the microphone modules 1A to 1D are not distinguished from each other, an alphabetical character at the end is omitted as in "microphone module 1". The elements included in the microphone module 1 are denoted in the same manner. In the example of FIG. 1, the number of microphone modules 1 is four, but is not limited thereto, and the number of microphone modules 1 can be arbitrarily changed according to a design concept, a design condition, and the like.

Figure 2:
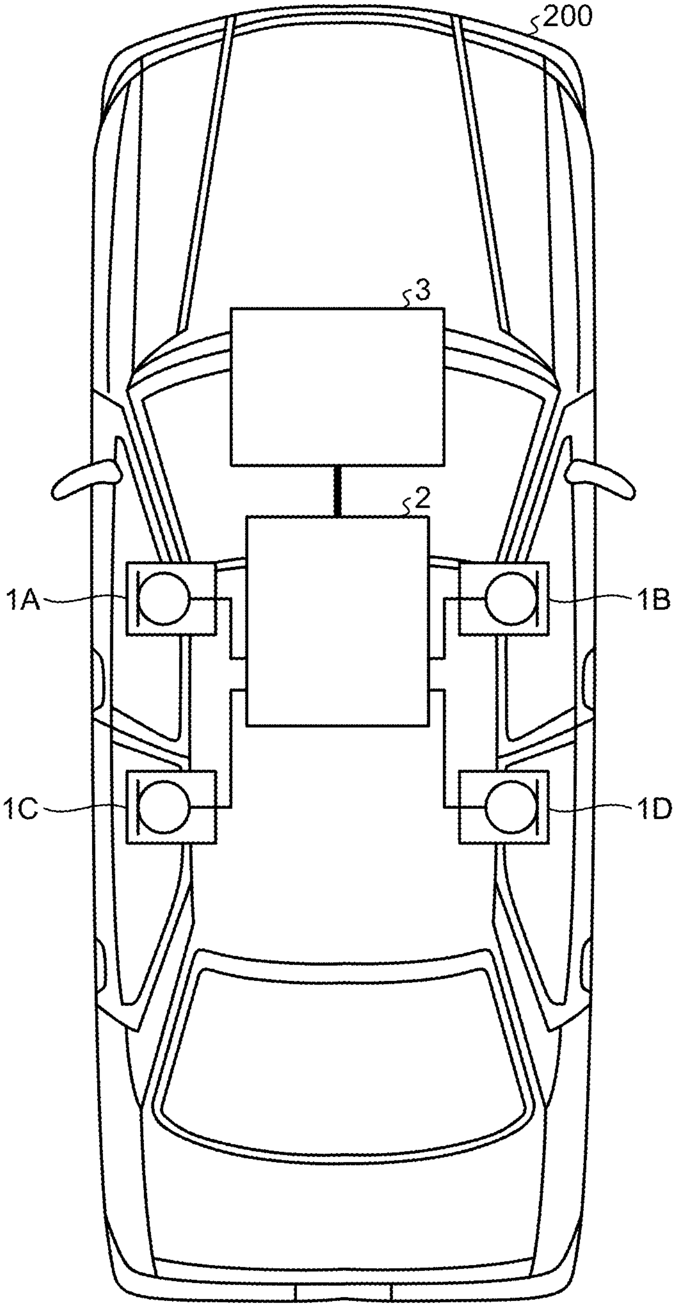
FIG. 2 is a diagram illustrating an example of a state in which the voice transmission system of the first embodiment is mounted on a vehicle.

FIG. 2 is a diagram illustrating an example of a case where the voice transmission system 10 of the present embodiment is mounted on a vehicle 200.

In the example of FIG. 2, the microphone modules 1A and 1C are disposed on the left side of the vehicle 200, and the microphone modules 1B and 1D are disposed on the right side of the vehicle 100. However, the present invention is not limited to this, and the arrangement of the microphone module 1 can be arbitrarily changed according to a design concept, a design condition, and the like. In addition, the device on which the voice transmission system 10 of the present embodiment is mounted is not limited to the vehicle 200, and can be mounted on various devices.

Returning to FIG. 1, the description will be continued. Each microphone module 1 includes a differential output microphone 103 having a first output terminal 101 and a second output terminal 102. In the present embodiment, a voltage supplied to the first output terminal 101 is higher than a voltage supplied to the second output terminal 102. The first output terminal 101 and the second output terminal 102 are connected to an input circuit 201 described later in the slave board 2.

Next, the configuration of the slave board 2 will be described.

As illustrated in FIG. 1, the slave board 2 includes the input circuit 201, an analog/digital converter 202A and an analog/digital converter 202B, and a slave circuit 203. In the following description, the analog/digital converter 202A and the analog/digital converter 202B will be referred to as "analog/digital converters 202" when they are not distinguished from each other.

A signal from the differential output microphone 103 is input to the input circuit 201. More specifically, signals from a differential output microphone 103A included in the microphone module 1A, a differential output microphone 103B included in the microphone module 1B, a differential output microphone 103C included in the microphone module 1C, and a differential output microphone 103D included in the microphone module 1D are input to the input circuit 201 of the present embodiment.

Figure 3:
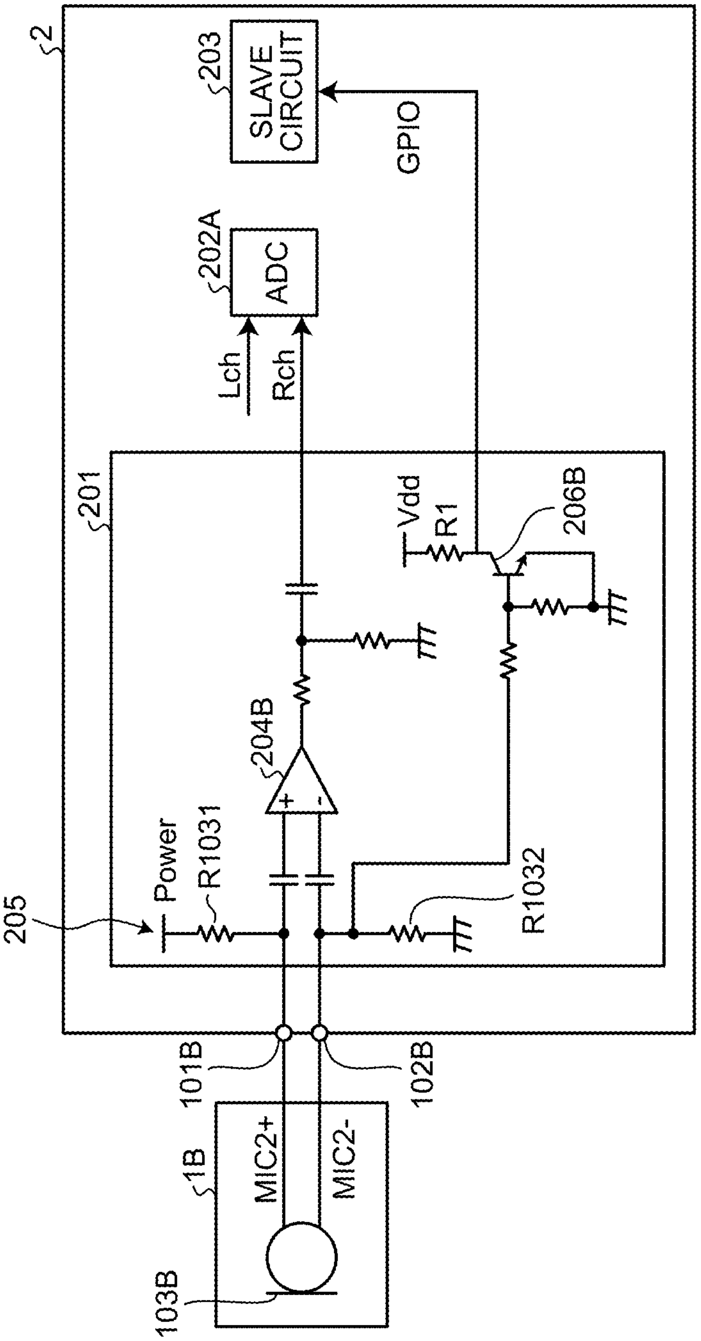
FIG. 3 is a diagram for describing a configuration of a slave board of the first embodiment.

FIG. 3 is a diagram illustrating only a circuit portion corresponding to one microphone module 1 (microphone module 1B in the example of FIG. 3) in the slave board 2, but circuit portions corresponding to the other three microphone modules 1 have the same configuration. Hereinafter, a specific configuration of the input circuit 201 will be described with reference to FIG. 3.

A circuit portion of the input circuit 201 corresponding to the microphone module 1B includes an operational amplifier 204B, a power supply 205, and a transistor 206B.

A first output terminal 101B and a second output terminal 102B of the differential output microphone 103B are connected to the input side of the operational amplifier 204B. In the present embodiment, the first output terminal 101B is connected to a positive input side, non-inverting input terminal of the operational amplifier 204B, and the second output terminal 102B on the lower potential side than the first output terminal 101B is connected to a negative input side, inverting input terminal of the operational amplifier 204B.

Furthermore, the analog/digital converter 202A is connected to an output side of the operational amplifier 204B. More specifically, an R channel terminal of the analog/digital converter 202A is connected to the output side of the operational amplifier 204B. With this configuration, the operational amplifier 204B outputs a signal obtained by differentially amplifying the analog voice signal input from each of the first output terminal 101B and the second output terminal 102B of the corresponding differential output microphone 103B to the R channel input terminal of the analog/digital converter 202A as an analog voice signal of the microphone module 1B.

In the first embodiment, the analog/digital converter 202A is provided corresponding to the microphone module 1A and the microphone module 1B. More specifically, the output side of the operational amplifier 204A included in the circuit portion of the input circuit 201 corresponding to the microphone module 1A is connected to an L channel terminal of the analog/digital converter 202A, and the output side of the operational amplifier 204B included in the circuit portion of the input circuit 201 corresponding to the microphone module 1B is connected to the R channel terminal of the analog/digital converter 202A.

That is, the analog voice signal of the microphone module 1A is input to the L channel terminal of the analog/digital converter 202A, and the analog voice signal of the microphone module 1B is input to the R channel terminal.

Similarly, the analog/digital converter 202B (not illustrated in FIG. 3) is provided corresponding to the microphone module 1C and the microphone module 1D.

More specifically, the output side of an operational amplifier 204C included in the circuit portion of the input circuit 201 corresponding to the microphone module 1C is connected to the L channel terminal of the analog/digital converter 202B, and the output side of an operational amplifier 204D included in the circuit portion of the input circuit 201 corresponding to the microphone module 1D is connected to the R channel terminal of the analog/digital converter 202B.

That is, the analog voice signal of microphone module 1C is input to the L channel terminal of analog/digital converter 202B, and the analog voice signal of microphone module 1D is input to the R channel terminal.

In the above configuration, data transmission paths of the analog/digital converter 202A and the analog/digital converter 202B are serially connected. Furthermore, a frame synchronization signal Frame and a bit clock signal Bit Clock are input from the slave circuit 203 to the analog/digital converter 202A and the analog/digital converter 202B for time-division multiplexing.

Then, based on the frame synchronization signal Frame and the bit clock signal Bit Clock, the analog/digital converter 202A performs data writing to the frame data bit by bit while performing frame synchronization, thereby allocating the R-channel digital voice signal and the L-channel digital voice signal to a plurality of time slots allocated to the analog/digital converter 202A and transmitting the same to the analog/digital converter 202B as frame data.

More specifically, in the first embodiment, the digital voice signal (L-channel digital voice signal) of the microphone module 1A and the digital voice signal (R-channel digital voice signal) of the microphone module 1B are allocated to two time slots of the frame data corresponding to the L-channel digital voice signal and the R-channel digital voice signal allocated to the analog/digital converter 202A.

Then, based on the frame synchronization signal Frame and the bit clock signal Bit Clock, the analog/digital converter 202B that has received the frame data from the analog/digital converter 202A allocates the digital voice signal of the R channel and the digital voice signal of the L channel to a plurality of time slots allocated to the analog/digital converter 202B constituting the frame data input from the analog/digital converter 202A, and transmits the same to the slave circuit 203 as completed frame data.

More specifically, in the first embodiment, the digital voice signal (the digital voice signal of the L channel) of the microphone module 1C and the digital voice signal (the digital voice signal of the R channel) of the microphone module 1D are allocated to two time slots of the frame data corresponding to the L channel digital voice signal and the R channel digital voice signal allocated to the analog/digital converter 202B, and are transmitted to the slave circuit 203 as completed frame data.

As a result, the slave circuit 203 outputs the multiplexed digital voice signal to the master board 3.

The description of the input circuit 201 will be continued. In the example of FIG. 3, the power supply 205 is connected to the input side of the operational amplifier 204B and performs phantom power supply.

In the example of FIG. 3, a non-inverting input terminal of the operational amplifier 204B is connected to the power supply 205 via a phantom resistor R1031, while an inverting input terminal of the operational amplifier 204B is grounded via a phantom resistor R1032.

The transistor 206B is connected between the input side of an operational amplifier 204 and the slave circuit 203. The transistor 206B is an example of an "output section" that outputs a first output voltage to the slave circuit 203 when the differential output microphone 103 is connected to the input circuit 201, and outputs a second output voltage different from the first output voltage to the slave circuit 203 when the differential output microphone 103 is not connected to the input circuit 201.

In this case, the case where the differential output microphone 103 is not connected to the input circuit 201 includes a case where the differential output microphone 103 cannot normally output an audio analog signal, such as a case where the output terminal of the differential output microphone is not physically connected to the input circuit 201 and a case where the differential output microphone 103 is not electrically connected such as disconnection.

Depending on the type of a transistor 206, one of the first output terminal 101B and the second output terminal 102B is connected to a base or a gate of the transistor 206B, and a collector or a drain as the output terminal of the transistor 206B is connected to the slave circuit 203.

Here, the type of transistor refers to an NPN bipolar transistor, a PNP bipolar transistor, an N-channel MOS transistor, a P-channel MOS transistor, or the like.

In the first embodiment, the transistor 206B is an NPN bipolar transistor.

Therefore, in the example of FIG. 3, the second output terminal 102B on the low potential side of the first output terminal 101B and the second output terminal 102B is connected to the base of the transistor 206B.

In addition, in a case where the differential output microphone 103 is connected to the input circuit 201, the voltage of the second output terminal 102B is set to be larger than a threshold (voltage) of the transistor 206B. That is, the transistor 206B is turned on, and a connection detection signal of the differential output microphone 103 is set to be output.

In the present embodiment, when the differential output microphone 103 and the input circuit 201 are connected, that is, when each of the first output terminal 101B and the second output terminal 102B is connected to the non-inverting input terminal and the inverting input terminal of the operational amplifier 204B, the respective values of the voltage of the second output terminal 102B, the voltage of the power supply 205, the resistor R1031, and the resistor R1032 are set such that the voltage of the second output terminal 102B is larger than the threshold of the transistor 206B.

Figure 4:
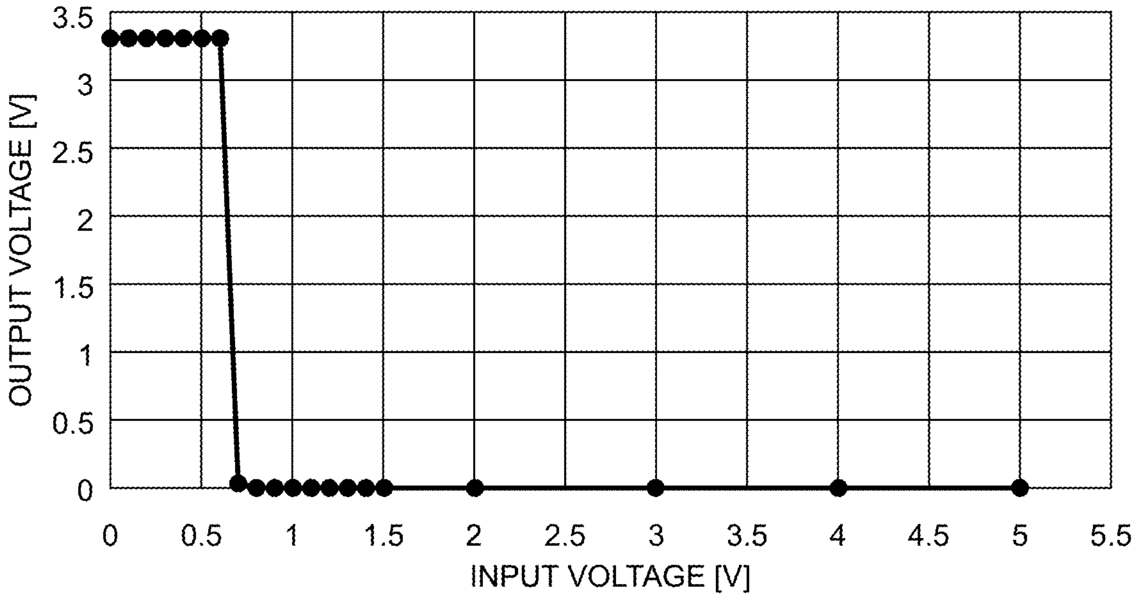
FIG. 4 is a diagram illustrating an example of characteristics of a transistor of the first embodiment.

FIG. 4 is a diagram illustrating an example of characteristics of the transistor 206B of the present embodiment.

In the example of FIG. 4, the voltage of the base as the control input terminal is represented on a horizontal axis as the input voltage, and the voltage of the collector as the output terminal is represented on a vertical axis as the output voltage.

In the example of FIG. 4, a threshold voltage of the transistor 206B is about 0.7 V, and when the voltage (input voltage) of the base is less than 0.7 V, the transistor 206B is turned off, and the voltage (output voltage) of the collector is at the same potential as a voltage Vdd of the power supply.

In the example of FIG. 3, the voltage of the collector as the output terminal at this time is about 3.3 V. Meanwhile, when the voltage of the base is 0.7 V or more, the transistor 206B is turned on, and the collector is grounded to become the same potential as the ground potential GND (0 V in this example). In the example of FIG. 3, the voltage of the collector at this time is 0 V.

The description of FIG. 3 will be continued. In the present embodiment, the voltage of the power supply 205 is, for example, 8 V, and when the differential output microphone 103B is connected to the input circuit 201 (in a case where each of the first output terminal 101B and the second output terminal 102B is operably connected to the non-inverting input terminal and the inverting input terminal of the operational amplifier 204B via a smoothing capacitor), the voltage of the second output terminal 102B is set to 2 V. In this case, since the voltage of the second output terminal 102B input to the base of the transistor 206B exceeds the threshold (0.7 V), the transistor 206B is turned on.

Meanwhile, when the differential output microphone 103B is disconnected without being connected to the input circuit 201 (when the second output terminal 102B is not connected to the non-inverting input terminal of the operational amplifier 204B), the base of the transistor 206B is grounded via the resistor R1032 and has the same potential as the ground potential GND. As a result, the voltage of the base of the transistor 206B becomes substantially 0 V and falls below the threshold, so that the transistor 206B is turned off.

In the example of FIG. 3, the collector (an example of the "output terminal") of the transistor 206B is connected to the slave circuit 203. As described above, when the differential output microphone 103B and the input circuit 201 are connected, since the transistor 206B is turned on, the collector is grounded and becomes the same potential as the ground potential GND, and the ground potential GND is output to the slave circuit 203 as the first output voltage.

As described above, when the differential output microphone 103B and the input circuit 201 are disconnected without being connected, the transistor 206B is turned off. As a result, from the collector of the transistor 206B, a voltage dropped from the voltage Vdd of the power supply by the amount of the resistor R1 interposed between the power supply of the transistor 206B and the collector is output to the slave circuit 203 as the second output voltage. In the following description, the voltage (the first output voltage or the second output voltage) output from the collector to the slave circuit 203 may be referred to as a GPIO signal (GPIO0 to GPIO3 in FIG. 1).

In addition to the digital voice signal described above, the slave circuit 203 outputs, to the master board 3, a GPIO signal output from the collector of the transistor 206 provided for each microphone module 1. The configuration of the slave board 2 has been described above.

Returning to FIG. 1, the configuration of the master board 3 will be described. As illustrated in FIG. 1, the master board 3 includes a master circuit 301, a signal processing circuit (hereinafter referred to as "DSP") 302, an output circuit 303, and a communication circuit 304.

The master circuit 301 outputs the digital voice signal and the GPIO signal received from the slave circuit 203 to the DSP 302. The DSP 302 has a function (determination unit) of determining whether the microphone module 1 (differential output microphone 103) and the input circuit 201 are connected based on a GPIO signal for each microphone module 1.

More specifically, the determination unit determines that the differential output microphone 103 and the input circuit 201 are connected when the GPIO signal input from the master circuit 301 indicates the first output voltage, and determines that the differential output microphone 103 is not connected to the input circuit 201 when the GPIO signal indicates the second output voltage.

In the present embodiment, the determination unit is provided in the DSP 302, but the present invention is not limited thereto, and for example, the determination unit may be provided in the master circuit 301 or may be provided on the slave board 2 side (for example, the slave circuit 203 or the like).

The DSP 302 connected to the master circuit 301 performs processing such as filtering on the digital voice signal input from the master circuit 301, generates data according to an output format, and passes the data to the output circuit 303.

The output circuit 303 outputs the data input from the DSP 302 to a device such as the speaker 4. In addition, the output circuit 303 can output data input from the DSP 302 to the outside via the communication circuit 304.

(1.1) Modification of First Embodiment

Figure 5:
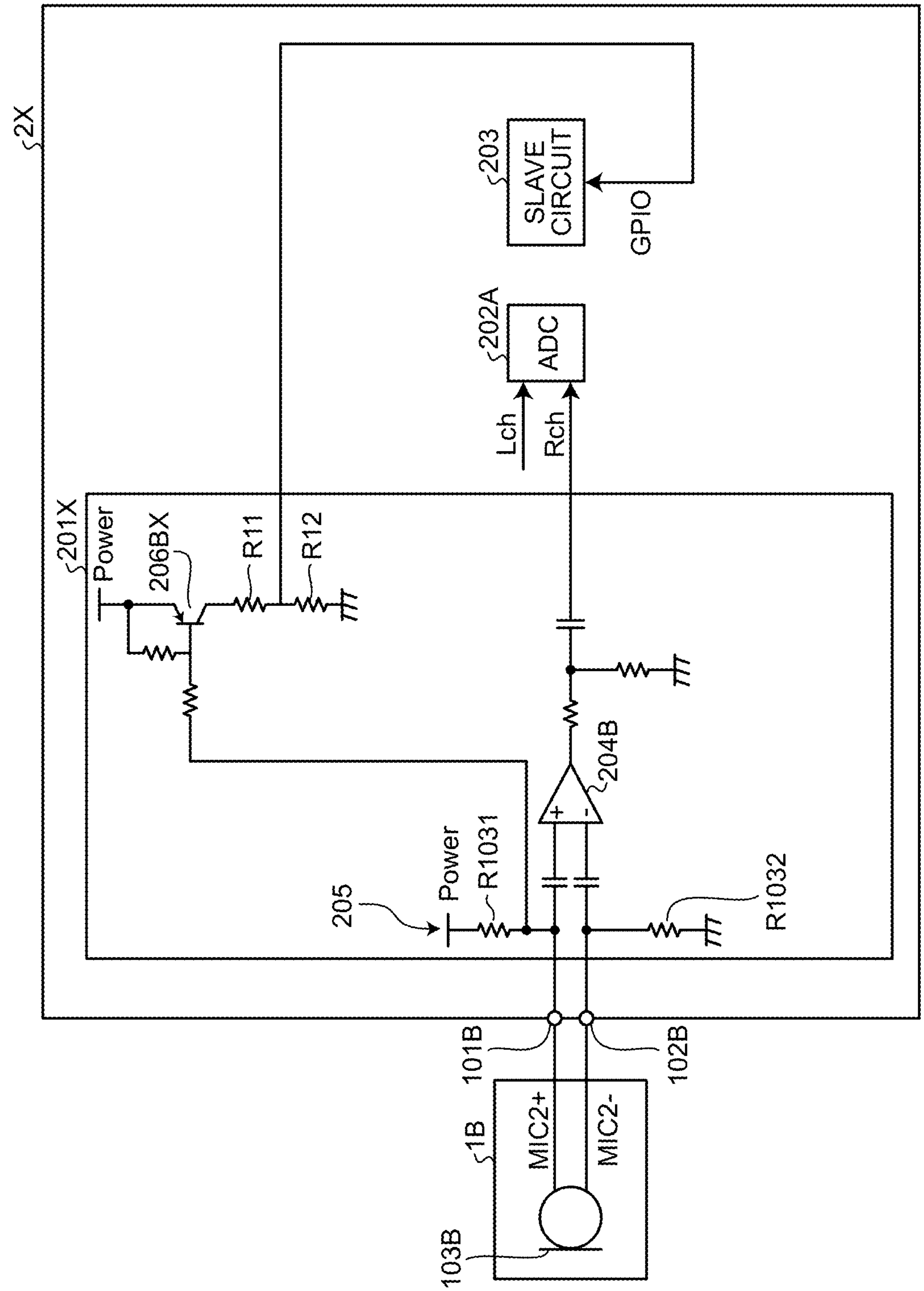
FIG. 5 is a diagram for explaining a configuration of a slave board according to a modification of the first embodiment.

FIG. 5 is a diagram for describing a configuration of a slave board according to a modification of the first embodiment.

In FIG. 5, parts similar to those in FIG. 3 are denoted by the same reference numerals.

Similarly to FIG. 3, FIG. 5 is a diagram illustrating only a circuit portion of a slave board 2X corresponding to one microphone module 1 (microphone module 1B in the example of FIG. 5). A circuit portion corresponding to each of the other three microphone modules 1 has a similar configuration. Hereinafter, a specific configuration of an input circuit 201X will be described with reference to FIG. 5.

A circuit portion of the input circuit 201X corresponding to the microphone module 1B includes an operational amplifier 204B, a power supply 205, and a transistor 206BX.

The first output terminal 101B and the second output terminal 102B of the differential output microphone 103B are connected to the input side of the operational amplifier 204B. In the present embodiment, the first output terminal 101B is connected to a positive input side, non-inverting input terminal of the operational amplifier 204B, and the second output terminal 102B on the lower potential side than the first output terminal 101B is connected to a negative input side, inverting input terminal of the operational amplifier 204B.

Furthermore, the analog/digital converter 202A is connected to an output side of the operational amplifier 204B. More specifically, an R channel terminal of the analog/digital converter 202A is connected to the output side of the operational amplifier 204B. With this configuration, the operational amplifier 204B outputs a signal obtained by differentially amplifying the analog voice signal input from each of the first output terminal 101B and the second output terminal 102B of the corresponding differential output microphone 103B to the R channel input terminal of the analog/digital converter 202A as an analog voice signal of the microphone module 1B.

Then, based on the frame synchronization signal Frame and the bit clock signal Bit Clock, the analog/digital converter 202A performs data writing to the frame data bit by bit while performing frame synchronization, thereby allocating the R-channel digital voice signal and the L-channel digital voice signal to a plurality of time slots allocated to the analog/digital converter 202A and transmitting the same to the analog/digital converter 202B as frame data.

Then, based on the frame synchronization signal Frame and the bit clock signal Bit Clock, the analog/digital converter 202B that has received the frame data from the analog/digital converter 202A allocates the digital voice signal of the R channel and the digital voice signal of the L channel to a plurality of time slots allocated to the analog/digital converter 202B constituting the frame data input from the analog/digital converter 202A, and transmits the same to the slave circuit 203 as completed frame data.

As a result, the slave circuit 203 outputs the multiplexed digital voice signal to the master board 3.

The description of the input circuit 201X will be continued.

Also in the example of FIG. 5, the power supply 205 is connected to the input side of the operational amplifier 204B and performs phantom power supply.

Also in the example of FIG. 5, the non-inverting input terminal of the operational amplifier 204B is connected to the power supply 205 via the phantom resistor R1031, and the inverting input terminal of the operational amplifier 204B is grounded via the phantom resistor R1032.

A transistor 206BX is connected between the input side of the operational amplifier 204 and the slave circuit 203. The transistor 206BX is an example of an "output section" that outputs a first output voltage to the slave circuit 203 when the differential output microphone 103 is connected to the input circuit 201, and outputs a second output voltage different from the first output voltage to the slave circuit 203 when the differential output microphone 103 is not connected to the input circuit 201.

The first output terminal 101B is connected to the base as the control input terminal of the transistor 206BX, and the collector as the output terminal of the transistor 206BX is connected to the slave circuit 203 via the resistor R11 among a voltage-dividing resistors R11 and R12.

In the modification of the first embodiment, the transistor 206BX is a PNP bipolar transistor.

In the example of FIG. 5, among the first output terminal 101B and the second output terminal 102B, the first output terminal 101B on the high potential side is connected to the base as the control input terminal of the transistor 206BX.

In addition, in a case where the differential output microphone 103 is connected to the input circuit 201, the voltage of the first output terminal 101B is set to be smaller than the threshold of the transistor 206BX. That is, the transistor 206BX is set to be turned on.

In the modification of the first embodiment, when the differential output microphone 103 is connected to the input circuit 201, that is, when each of the first output terminal 101B and the second output terminal 102B is connected to the non-inverting input terminal and the inverting input terminal of the operational amplifier 204B, the respective values of the voltage of the first output terminal 101B, the voltage of the power supply 205, the resistor R1031, and the resistor R1032 are set such that the voltage of the first output terminal 101B is smaller than the threshold of the transistor 206BX.

As described above, in the first embodiment or the modification of the first embodiment, the input circuit 201 is provided on the slave board 2, and the transistor 206 is provided in the input circuit 201 for each differential output microphone 103. One of the first output terminal 101 and the second output terminal 102 of the differential output microphone 103 is connected to the base as the control input terminal of the transistor 206, and the collector of the transistor 206 as the output terminal is connected to the slave circuit 203.

Then, the transistor 206 outputs the first output voltage to the slave circuit 203 when the differential output microphone 103 is connected to the input circuit 201, and outputs the second output voltage to the slave circuit 203 when the differential output microphone 103 is not connected to the input circuit 201. That is, the output voltage of the transistor 206 differs depending on whether the differential output microphone 103 and the input circuit 201 are connected.

That is, by checking the output voltage, it can be determined whether the differential output microphone 103 is connected to the input circuit 201.

Therefore, according to the present embodiment, it is not necessary to provide a dedicated line for disconnection detection, and the disconnection can be detected based on the voltage output from the transistor 206. Therefore, it is possible to provide the voice transmission system 1 capable of detecting the disconnection while suppressing the complexity of the wiring.

Although the above description is a case where the transistor 206 (transistor 206X) is a bipolar transistor, similarly, an N-channel MOS transistor or a P-channel MOS transistor can be used as the transistor 206.

(2) Second Embodiment

Next, a second embodiment will be described.

The second embodiment is different from the first embodiment in that the DSP 302 prohibits the determination by the determination unit when the voice level of the voice signal (digital voice signal) input from the master circuit 301 is larger than the threshold.

Figure 6:
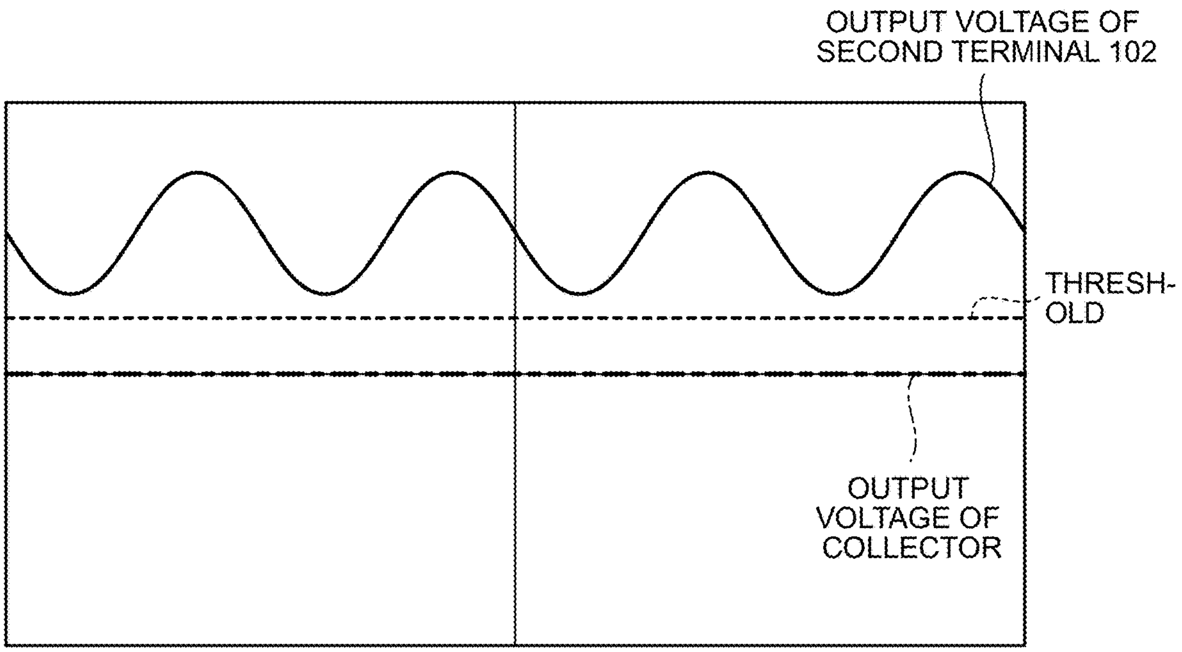
FIG. 6 is a diagram illustrating a voltage of a second terminal and a voltage of a collector according to a second embodiment.

FIG. 6 is a diagram illustrating the voltage at the second output terminal 102 and the voltage (collector voltage) at the transistor 206 when an operating region of the microphone module 1 is in a linear region where the voice level of the input voice and the output voltage of the microphone module 1 are in a proportional relationship.

In the example of FIG. 6, since the voltage of the second output terminal 102 exceeds the threshold of the transistor 206, the transistor 206 is turned on, the collector is grounded, and the ground potential GND (approximately 0 V in this example) is output as the first output voltage. In this case, since the GPIO signal indicates the first output voltage, it is determined that the microphone module 1 is in the connected state, that is, the differential output microphone 103 is connected to the input circuit 201.

Figure 7:
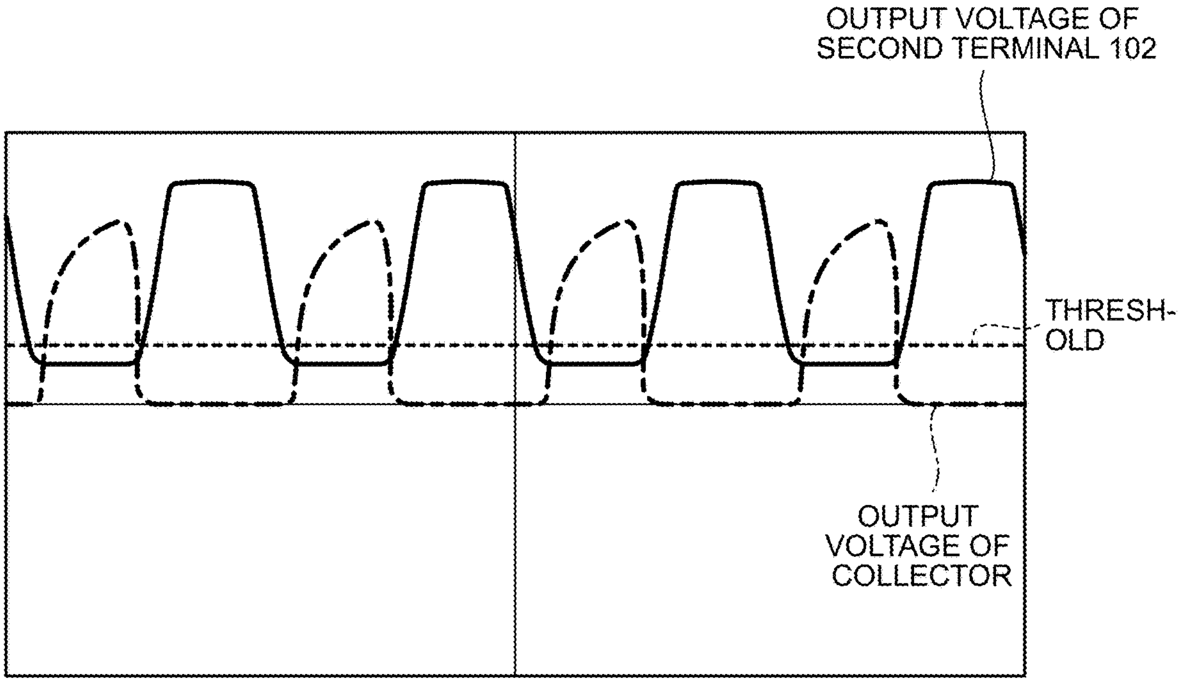
FIG. 7 is a diagram illustrating a voltage of a second terminal and a voltage of a collector according to a second embodiment.

FIG. 7 is a diagram illustrating the voltage of the second output terminal 102 and the voltage of the transistor 206 when the operating region of the microphone module 1 is in a saturation region where the voice level of the input voice and the output voltage of the microphone module 1 are not in a proportional relationship and the output voltage becomes constant at a predetermined voice level or higher.

In the example of FIG. 7, there is a period in which the minimum voltage of the second output terminal 102 falls below the threshold of the transistor 206, so that there is a period in which the transistor 206 is turned off, and the voltage of the collector becomes the second output voltage (>0 V) dropped from the voltage Vdd of the power supply of the transistor 206B by the amount of the resistor R1.

In this case, even when the microphone module 1 is in the connected state, since the GPIO signal indicates the second output voltage in a period in which the minimum voltage of the second output terminal 102 falls below the threshold of the transistor 206, it is determined that the differential output microphone 103 and the input circuit 201 are not connected. That is, when the microphone module 1 is in the saturation region, erroneous determination occurs in determination (determination of connection) of whether the microphone module 1 is in the connected state.

Therefore, when the microphone module 1 is in the saturation region, that is, when the voice signal level corresponding to the digital voice signal (the digital voice signal input to the master circuit 301) output from the slave circuit 203 is larger than the threshold, the DSP 302 according to the second embodiment invalidates the determination by the determination unit, so that the above-described erroneous detection can be prevented.

Figure 8:
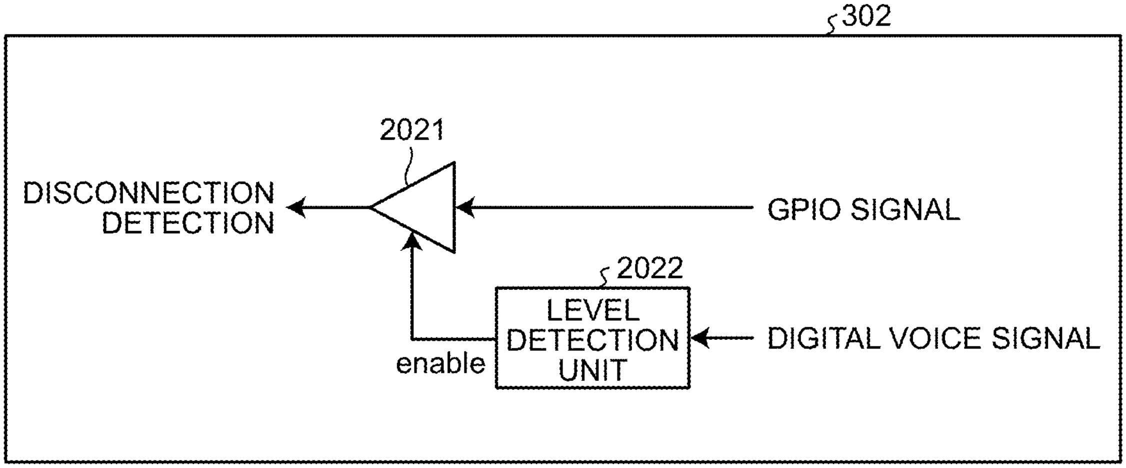
FIG. 8 is a diagram illustrating an example of a configuration of a DSP of a second embodiment.

For example, as illustrated in FIG. 8, the DSP 302 may include a buffer (gate) 2021 and a level detection unit 2022. In a case where the GPIO signal is less than a predetermined reference value, the level detection unit 2022 outputs an enable signal that causes the buffer 2021 to be in an operable state (enable state).

In this example, since the second output voltage is set to a value larger than the reference value, when the second output voltage is input to the buffer 2021 as a GPIO signal, the buffer 2021 outputs a high-level signal. In this example, the buffer 2021 outputting a high-level signal means that the non-connection state (disconnection) of the microphone module 1 has been detected.

The level detection unit 2022 receives the digital voice signal from the master circuit 301. When the voice signal level corresponding to the digital voice signal received from master circuit 301 is larger than the threshold, level detection unit 2022 outputs an enable signal for disabling (for example, the output terminal is in a high-impedance state) the output of buffer 2021 to buffer 2021, and stops the output operation of buffer 2021.

As described above, according to the second embodiment, even when the operating region of the microphone module 1 is in the saturation region, the connection state of the microphone module 1 can be accurately determined, so that erroneous connection determination can be prevented.

(3) Third Embodiment

Next, a third embodiment will be described.

Figure 9:
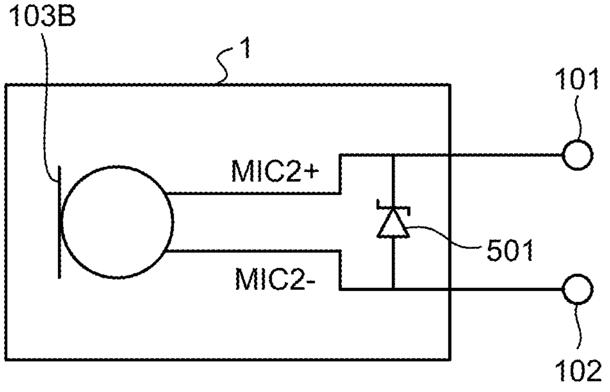
FIG. 9 is a diagram illustrating an example of a configuration of a microphone module according to a third embodiment.
Figure 10:
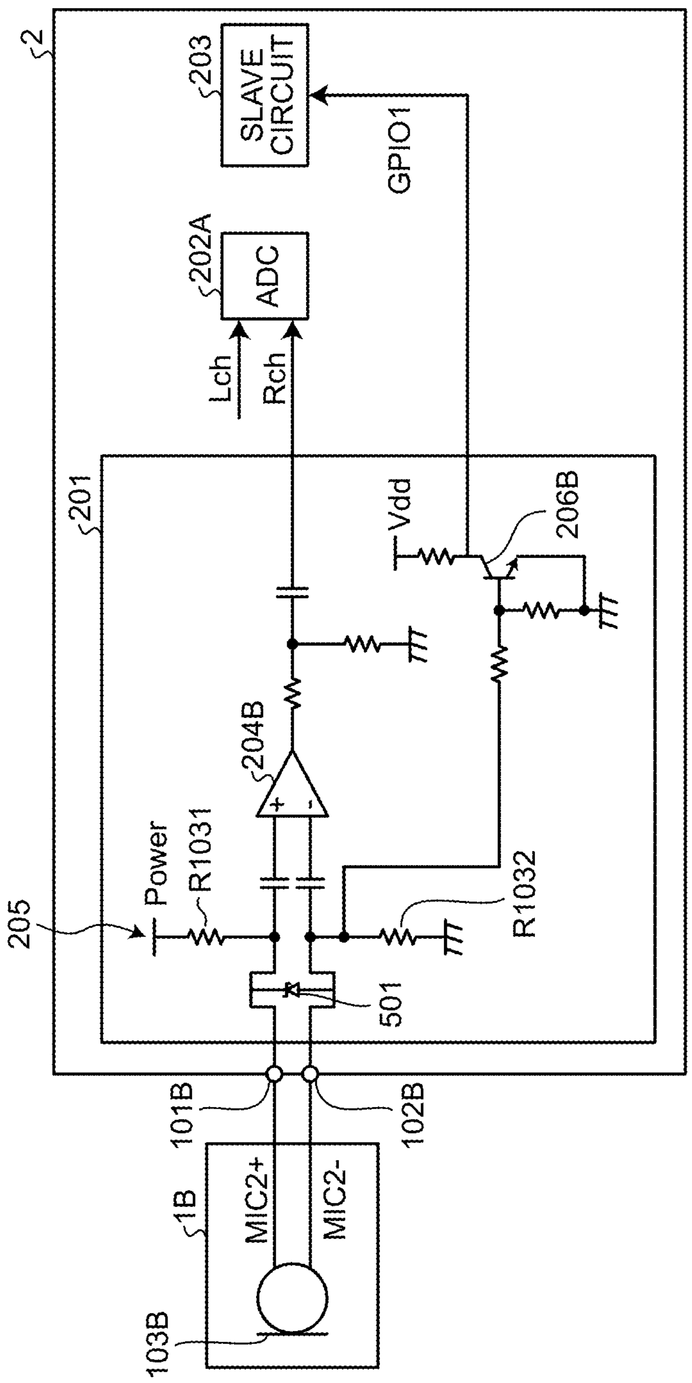
FIG. 10 is a diagram illustrating an example of a configuration of an input circuit according to a third embodiment.

As illustrated in FIG. 9 or FIG. 10, in the third embodiment, a Zener diode 501 connected between the first output terminal 101 and the second output terminal 102 is further provided, and a Zener voltage of the Zener diode 501 is set such that the voltage of one of the first output terminal 101 and the second output terminal 102 connected to the base of the transistor 206 falls within a range that maintains the operating state of the transistor 206 when the differential output microphone 103 and the input circuit 201 are connected.

As in the first embodiment described above, when the transistor 206 is an NPN bipolar transistor, the second output terminal 102 on the low potential side of the first output terminal 101 and the second output terminal 102 is connected to the base of the transistor 206.

The Zener voltage of the Zener diode 501 is set such that the minimum value of the voltage of the second output terminal 102 connected to the base of the transistor 206 among the first output terminal 101 and the second output terminal 102 exceeds the threshold of the transistor 206. In this example, since the operating state of the transistor 206 at the time of connection between the differential output microphone 103 and the input circuit 201 is the ON state, the Zener voltage is set such that the minimum value of the voltage of the second output terminal 102 exceeds the threshold of the transistor 206.

Incidentally, the phantom resistor R1031 and the phantom resistor R1032, which are the resistances of the power supply 205 that performs the phantom power supply illustrated in FIG. 3, generally have the same resistance value. In addition, the base pull-in current of the transistor 206 is negligibly small with respect to the current flowing through the phantom resistor R1032.

As a result, the currents flowing through the resistor R1031 and the resistor R1032 become equal. When the Zener voltage Vz is set to an appropriate value equal to or less than the voltage Power of the power supply 205, the maximum voltage of the first output terminal 101 and the minimum voltage of the second output terminal 102 can be expressed by the following Equations 1 and 2, respectively.

$$\text{Maximum voltage of first output terminal 101} = (\text{Power} + Vz)/2 \quad \text{(Equation 1)}$$

$$\text{Minimum voltage of second output terminal 102} = (\text{Power} - Vz)/2 \quad \text{(Equation 2)}$$

In the third embodiment, the Zener voltage Vz is set such that the minimum voltage of the second output terminal 102 expressed by the above Equation 2 exceeds the threshold of the transistor 206, whereby the transistor 206 maintains the ON state even when the operating region of the microphone module 1 is in the saturation region. That is, even when the operating region of the microphone module 1 is in the saturation region, the operating state of the transistor 206 at the time of connection between the differential output microphone 103 and the input circuit 201 is maintained in the on-state, so that the collector is grounded and the ground potential GND (0 V in this example) is output as the first output voltage. In this case, since the GPIO signal indicates the first output voltage, it is determined that the microphone module 1 is connected to the input circuit 201.

That is, also in the third embodiment, as in the second embodiment, even when the operating region of the microphone module 1 is in the saturation region, the connection state of the microphone module 1 can be accurately determined, so that erroneous connection determination can be prevented.

For example, as illustrated in FIG. 9, the Zener diode 501 may be provided in the microphone module 1. Furthermore, for example, as illustrated in FIG. 10, the Zener diode 501 may be provided in the input circuit 201.

(4) Fourth Embodiment

Next, a fourth embodiment will be described.

Figure 11:
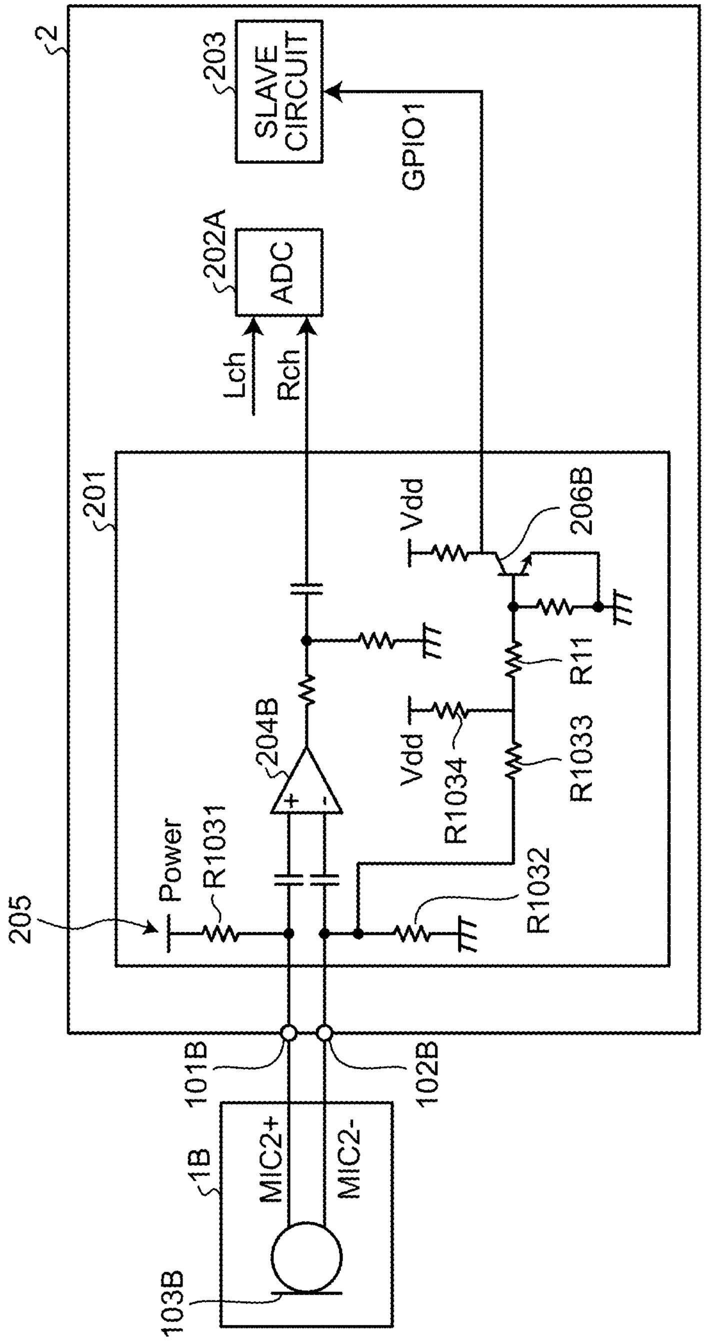
FIG. 11 is a diagram illustrating an example of a configuration of an input circuit according to a fourth embodiment.

The fourth embodiment is different from each of the above-described embodiments in that a resistor for adjusting a threshold of a transistor 206 is provided. As illustrated in FIG. 11, the first resistor R11 is connected to the base of the transistor 206. The first resistor R11 is also provided in each of the above-described embodiments. As illustrated in FIG. 11, in the present embodiment, a second resistor R1033 connected in series to the first resistor R11, and a third resistor R1034 having one end connected to a connection point between the first resistor R11 and the second resistor R1033 and the other end connected to the power supply Vdd are further included.

Similarly to the above-described embodiments, the transistor 206 is an NPN bipolar transistor. In the fourth embodiment, the resistance value of each of the first resistor R11, the second resistor R1033, and the third resistor R1034 is set such that the threshold of the transistor 206 falls below the minimum value of the voltage of the second output terminal 102 connected to the base of the transistor 206.

As a result, even when the microphone module 1 is in the saturation region, the operating state of the transistor 206 at the time of connection between the differential output microphone 103 and the input circuit 201 maintains the ON state, and thus, similarly to the above, the GPIO signal indicates the first output voltage, and it is determined that the microphone module 1 is in the connected state. That is, even when the microphone module 1 is in the saturation region, erroneous connection determination can be prevented.

Although the embodiments of the present disclosure have been described above, the above-described embodiments have been presented as examples, and are not intended to limit the scope of the invention. These novel embodiments can be implemented in various other forms, and various omissions, substitutions, and changes can be made without departing from the gist of the invention. These novel embodiments and modifications thereof are included in the scope and gist of the invention, and are included in the invention described in the claims and the equivalent scope thereof.

Furthermore, the effects of the embodiments described in the present specification are merely examples and are not limited, and other effects may be provided.

(5) Other Modifications of Embodiments

Hereinafter, other modifications of the embodiment will be described.

(5.1) First Another Modification

Figure 12:
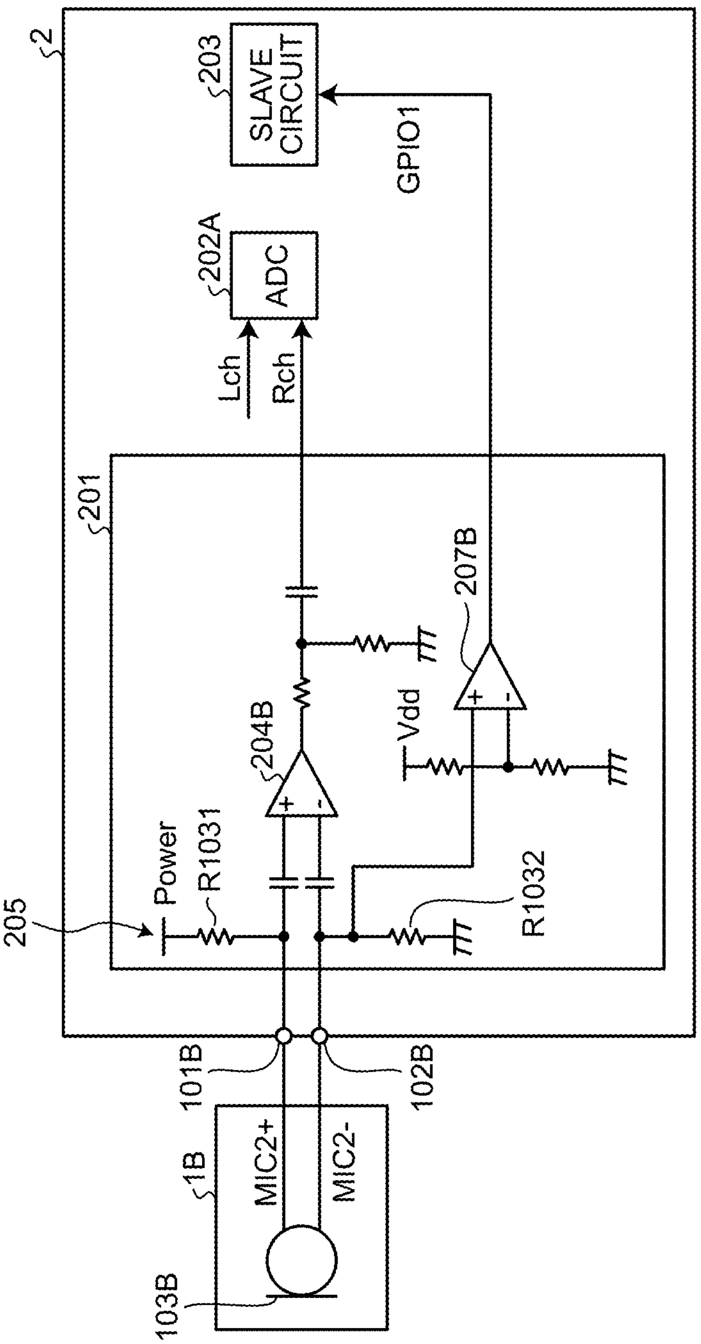
FIG. 12 is a diagram illustrating a modification of an output section.

In each of the above-described embodiments, the transistor 206 is adopted as an example of the “output section”, but the present invention is not limited thereto, and for example, as illustrated in FIG. 12, the comparator 207B may be adopted as the “output section”.

In the example of FIG. 12, the reference voltage is input to the inverting input terminal of the comparator 207B by a voltage-dividing resistor, and the second output terminal 102B is connected to the non-inverting input terminal.

The output side of the comparator 207B is connected to the slave circuit 203.

As a result, when the differential output microphone 103B is connected to the input circuit 201, the voltage of the non-inverting input terminal of the comparator 207B becomes lower than the reference voltage input to the inverting input terminal, so that the output of the comparator 207B becomes the low level, and the GPIO signal indicating the low level is output to the slave circuit 203.

Meanwhile, when the differential output microphone 103B is not connected to the input circuit 201, the output of the comparator 207B becomes the high level, and the voltage of the non-inverting input terminal of the comparator 207B becomes higher than the reference voltage input to the inverting input terminal, so that the GPIO signal indicating the high level is output to the slave circuit 203.

In the configuration of FIG. 12, since the output voltage level (high level or low level) of the comparator 207B differs depending on whether the differential output microphone 103 and the input circuit 201 are connected, it is possible to determine whether the differential output microphone 103 and the input circuit 201 are connected by checking the output voltage. That is, according to the configuration of FIG. 12, it is not necessary to provide a dedicated line for disconnection detection, and the disconnection can be detected based on the voltage output from the comparator 207B. Therefore, it is possible to provide the voice transmission system 1 capable of detecting the disconnection while suppressing the complexity of the wiring.

(5.2) Second Another Modification

Figure 13:
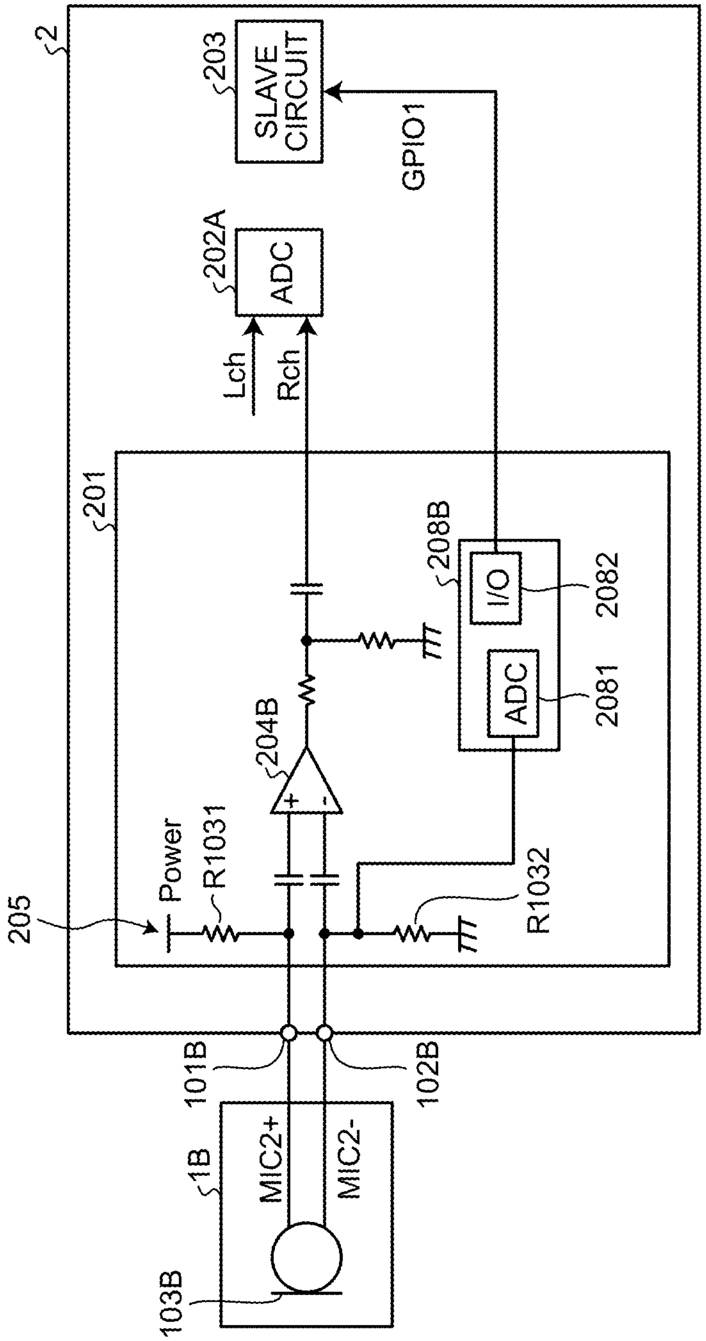
FIG. 13 is a diagram illustrating a modification of the output section.

Further, for example, as illustrated in FIG. 13, a microcomputer 208B may be employed as an "output section".

In the example of FIG. 13, the microcomputer 208B includes an analog/digital converter (denoted as "ADC") 2081 and an I/O port 2082. The voltage of the second output terminal 102B is input to the ADC 2081, and the ADC 2081 converts the input analog voltage signal into a digital voltage signal. The I/O port 2082 outputs the digital voltage signal input from the ADC 2081 to the slave circuit 203.

Also in the configuration of FIG. 13, since the output voltage of the I/O port 2082 differs depending on whether the differential output microphone 103 and the input circuit 201 are connected, it is possible to determine whether the differential output microphone 103 and the input circuit 201 are connected by checking the output voltage. That is, according to the configuration of FIG. 13, it is not necessary to provide a dedicated line for disconnection detection, and the disconnection can be detected based on the voltage output from the comparator 207B. Therefore, it is possible to provide the voice transmission system 1 capable of detecting the disconnection while suppressing the complexity of the wiring.

In short, the "output section" may be in any form as long as it is connected between the input side of the operational amplifier 204 and the slave circuit 203, and outputs the first output voltage to the slave circuit 203 when the differential output microphone 103 and the input circuit 201 are connected, and outputs the second output voltage different from the first output voltage to the slave circuit 203 when the differential output microphone 103 and the input circuit 201 are not connected. For example, as described above, the "output section" may be the transistor 206, a comparator 207, or a microcomputer 208.

The above-described embodiment can be arbitrarily combined with the above-described modifications, or the above-described modifications may be arbitrarily combined. In addition, the above-described embodiments may be arbitrarily combined.

According to an embodiment, it is not necessary to provide a dedicated line for detecting a disconnection, and a disconnection can be detected based on a voltage output from an output section. Therefore, it is possible to provide a voice transmission system capable of detecting a disconnection while suppressing complication of wiring. Note that the advantageous effect described here is not necessarily limiting, and any of the advantageous effects described in the disclosure may be provided.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A voice transmission system comprising:
- a master circuit;
- a slave circuit that is connected to the master circuit via one or more transmission lines;
- at least one microphone module that includes a differential output microphone having a first output terminal and a second output terminal;
- an input circuit into which a signal from the differential output microphone is input; and
- an analog/digital converter that outputs, to the slave circuit, a voice signal obtained by analog/digital conversion of a signal output from the input circuit,
- wherein the input circuit includes:
  - an operational amplifier having an input side and an output side, the first output terminal and the second output terminal of the differential output microphone being connected to the input side, the analog/digital converter being connected to the output side;
  - a power supply that is connected to the input side of the operational amplifier and performs phantom power supply; and
  - an output section that is connected between the input side of the operational amplifier and the slave circuit, outputs a first output voltage to the slave circuit when the differential output microphone is connected to the input circuit, and outputs a second output voltage different from the first output voltage to the slave circuit when the differential output microphone is not connected to the input circuit.

2. The voice transmission system according to claim 1, further comprising
- a hardware processor that determines that the differential output microphone is connected to the input circuit when the first output voltage is output from the output section, and determines that the differential output microphone is not connected to the input circuit when the second output voltage is output from the output section.

3. The voice transmission system according to claim 2, further comprising
- a signal processing circuit that is connected to the master circuit,
- wherein the signal processing circuit prohibits determination by the hardware processor when the voice signal is larger than a threshold.

4. The voice transmission system according to claim 1, wherein
- the output section is a transistor, and
- one of the first output terminal and the second output terminal is connected to a control input terminal of the transistor, and an output terminal of the transistor is connected to the slave circuit.

5. The voice transmission system according to claim 4, wherein
- the transistor constituting the output section is an NPN transistor, a PNP transistor, an N-channel MOS transistor, or a P-channel MOS transistor, and
- any one of the first output terminal and the second output terminal is connected to the control input terminal of the transistor, and a voltage of the any one of the first output terminal and the second output terminal connected to the control input terminal is set to a voltage capable of maintaining an ON state with respect to a threshold voltage of the transistor.

6. The voice transmission system according to claim 4, further comprising a Zener diode that is connected between the first output terminal and the second output terminal, wherein a Zener voltage of the Zener diode is set such that a voltage of an output terminal of one of the first output terminal and the second output terminal connected to the control input terminal falls within a range in which an ON state of the transistor is maintained when the differential output microphone and the input circuit are connected.

7. The voice transmission system according to claim 6, wherein when the transistor is an NPN transistor, one of the first output terminal and the second output terminal on a low potential side is connected to the control input terminal of the transistor, and the Zener voltage of the Zener diode is set such that a minimum value of a voltage of one of the first output terminal and the second output terminal connected to the control input terminal of the transistor exceeds a threshold of the transistor.

8. The voice transmission system according to claim 7, further comprising:

a first resistor that is connected to the control input terminal of the transistor;

a second resistor that is connected in series to the first resistor; and a third resistor that has one end connected to a connection point between the first resistor and the second resistor and another end connected to the power supply.

9. The voice transmission system according to claim 6, wherein the Zener diode is provided in the input circuit.

10. The voice transmission system according to claim 6, wherein the Zener diode is provided in the at least one microphone module.

* * * * *